(12) United States Patent
Lal et al.

(10) Patent No.: US 11,249,105 B2
(45) Date of Patent: Feb. 15, 2022

(54) SURFACE ACOUSTIC WAVE (SAW)-BASED INERTIAL SENSOR, METHODS, AND APPLICATIONS

(71) Applicant: CORNELL UNIVERSITY, Ithaca, NY (US)

(72) Inventors: Amit Lal, Ithaca, NY (US); Serhan Mehmet Ardanuc, Ithaca, NY (US)

(73) Assignee: CORNELL UNIVERSITY, Ithaca, NY (US)

( * ) Notice: Subject to any disclaimer, the term of this patent is extended or adjusted under 35 U.S.C. 154(b) by 576 days.

(21) Appl. No.: 16/081,559

(22) PCT Filed: Mar. 2, 2017

(86) PCT No.: PCT/US2017/020374
§ 371 (c)(1),
(2) Date: Aug. 31, 2018

(87) PCT Pub. No.: WO2017/151869
PCT Pub. Date: Sep. 8, 2017

(65) Prior Publication Data
US 2020/0408800 A1 Dec. 31, 2020

Related U.S. Application Data

(60) Provisional application No. 62/302,422, filed on Mar. 2, 2016.

(51) Int. Cl.
*G01P 15/097* (2006.01)
*G01L 1/16* (2006.01)
(Continued)

(52) U.S. Cl.
CPC ...... *G01P 15/0975* (2013.01); *G01C 19/5698* (2013.01); *G01L 1/165* (2013.01); *G01P 15/0802* (2013.01); *G01P 15/0922* (2013.01)

(58) Field of Classification Search
CPC ............. G01P 15/0975; G01P 15/0802; G01P 15/0922; G01L 1/165; G01C 19/5698; H03H 9/02645; H03H 9/6486
See application file for complete search history.

(56) References Cited

U.S. PATENT DOCUMENTS 4,078,186 A * 3/1978 Folen ................. G10K 11/36
310/26
8,181,521 B2 * 5/2012 Arakawa ........... G01C 19/5698
73/504.01
(Continued)

OTHER PUBLICATIONS

Nadig, S., et al., "DOME-DISC: Diffractive optics metrology enabled dithering inertial sensor calibration," in 2014 IEEE 27th International Conference on Micro Electro Mechanical Systems (MEMS), Jan. 26-30, 2014, Piscataway, NJ, 2014, pp. 608-611.
(Continued)

*Primary Examiner* — Xin Y Zhong
(74) *Attorney, Agent, or Firm* — George McGuire (57) ABSTRACT

A SAW-based inertial sensor incorporates a curved SAW drive resonator and graphene electrodes to increase the Coriolis force on a pillar array and generate secondary SAW waves that create a strain-induced hyperfine frequency transition in an enclosed alkali atom vapor, in conjunction with an integrated FP resonator to measure very small inertial signals corresponding to 10 μg and 0.01°/hr, representing a dynamic range of 10 orders of magnitude.

8 Claims, 9 Drawing Sheets

(51) Int. Cl.
G01P 15/08 (2006.01)
G01C 19/5698 (2012.01)
G01P 15/09 (2006.01)

(56) References Cited

U.S. PATENT DOCUMENTS

| | | | |
|---|---|---|---|
| 8,695,428 B2 | 4/2014 | Lee et al. | |
| 2003/0167841 A1 | 9/2003 | Varadan et al. | |
| 2005/0116263 A1 | 6/2005 | Lu et al. | |
| 2007/0103031 A1* | 5/2007 | Toda | G01N 29/07 310/313 R |
| 2007/0183190 A1* | 8/2007 | Eyckmans | G11C 11/1673 365/173 |
| 2008/0028855 A1* | 2/2008 | Kano | G01C 19/5698 73/504.12 |
| 2010/0253326 A1 | 10/2010 | Koyilothu et al. | |

OTHER PUBLICATIONS

Nadig, S. et al., "Monolithic piezoelectric in-plane motion stage with low cross-axis-coupling," in 27th IEEE Internationa Conference on Micro Electro Mechanical Systems, MEMS 2014, Jan. 26, 2014-Jan. 30, 2014, San Francisco, CA, 2014, pp. 524-527.
Yoshimizu, N., et al., "Nanometrology using a quasi periodic pattern diffraction optical ruler," Journal of Microelectromechanical Systems, vol. 19, No. 4 pp. 865-870, Aug. 2010.
Yoshimizu, N., et al., "MEMS diffractive optical nano ruler technology for tip based nanofabrication and metrology," in 22nd IEEE International Conference on Micro Electro Mechanical Systems, MEMS 2009, Jan. 25, 2009-Jan. 29, 2009, Sorrento, Italy, 2009, pp. 547-550.
Li, M. et al., Ultrasensitive NEMS-based cantilevers for sensing, scanned probe and very high-frequency applications, Nature Nanotechnology 2, pp. 114-120 (2007).
Wilson-Rae, I., et al., Theory of ground state cooling of a mechanical oscillator using dynamical back action, Physical Review Letters 99, 093901 (2007).
Safavi-Naeini, A.H., et al., Squeezed light from a silicon micromechanical resonator, Nature vol. 500, pp. 185-189 (Aug. 8, 2013).
Chakram, S., et al., Dissipation in ultrahigh quality factor SiN membrane resonators, Phys. Rev. Lett.112, 127201 (2014).
Chakram, S. et al., Thermo mechanical two-mode squeezing in an ultrahigh Q membrane resonator, Phys. Rev. Lett.115, 017202 (2015).
Chakram, S., et al., Multimode phononic correlations in a nondegenerate parametric amplifier, New Journal of Physics, 17, 063018 (2015).
Bariani, F., et al., Atom-based coherent quantum-noise cancellation in optomechanics, arXiv:1508.02322 (2015).
Hosseinzadegan, H., et al., "Graphene has ultra high piezoresistive gauge factor," in 2012 IEEE 25th International Conference on Micro Electro Mechanical Systems, MEMS 2012, Jan. 29, 2012-Feb. 2, 2012, Paris, France, 2012, pp. 611-614.
Insepov, Zinetula A., et al.; Acoustoelectric Properties of Graphene Under the Influence of Saw and External Electric Field; RENSIT 2015, vol. 7, No. 2, pp. 153-161.
International Search Report and Written Opinion for Application PCT/US2017/020374; Form PCT/ISA/210 and PCT/SA/237; dated Jun. 13, 2017; 7 pages.
Kolodzey, James et al., "Electrical conduction and dielectric breakdown in aluminum oxide insulators on silicon," Electron Devices, IEEE Transactions on , vol. 47, No. 1, pp. 121,128, Jan. 2000.
Seto, Takatoshi, "Effects of an electric field on the static friction of a metal on a ferroelectric material" Applied Physics Letters, 67 (3), pp. 442-443, Jul. 1995.
Kimura, Tetsuya, et al. "High Q SAW resonator using upper-electrodes on grooved-electrodes in LiTaO 3." Microwave Symposium Digest (MTT), 2010 IEEE MTT-S International. IEEE, 2010.

Parker, T. E. "Precision surface acoustic wave (SAW) oscillators." 1982 Ultrasonics Symposium. IEEE, 1982.
Liu, Qing-hui, et al. "Design of a novel MEMS IDT dual axes surface acoustic wave gyroscope." Nano/Micro Engineered and Molecular Systems, 2007. NEMS'07. 2nd IEEE International Conference on. IEEE, 2007 (abstract).
Varadan, Vijay K., et al., "Fabrication, characterization and testing of wireless MEMS-IDT based microaccelerometers." Sensors and Actuators A: Physical 90.1 (2001): 7-19.
Oh, H., et al. (2012). Development of novel dual-axis sensing gyroscope using surface acoustic wave. Microelectronic Engineering, 97, 259-264.
Oh, H., et al. (2011). Development of SAW based gyroscope with high shock and thermal stability. Sensors and Actuators A: Physical, 165(1), 8-15.
Oh, Haekwan, et al. "Development of surface acoustic wave-based microgyroscope utilizing progressive Wave." Japanese Journal of Applied Physics 49.6S (2010): 06GN16.
Lee, S. W., et al. (2007). A micro rate gyroscope based on the SAW gyroscopic effect. Journal of Micromechanics and Microengineering, 17(11), 2272.
Hoople, Jason, et al. "Chip-scale sonic communication using AlN transducers." Ultrasonics Symposium (IUS), 2013 IEEE International. IEEE, pp. 1934-1937.
Hoople, Jason, et al. "Towards ultrasonic through silicon vias (UTSV)." Ultrasonics Symposium (IUS), 2014 IEEE International. IEEE, pp. 483-486.
Kurosawa, Minoru, et al. "A surface-acoustic-wave gyro sensor." Sensors and Actuators A: Physical 66.1 (1998): 33-39.
Ardanç, S. M., et al. "Ultrasound enhanced electrostatic batch assembly for MEMS." Sensors and Actuators A: Physical 197 (2013): 136-149.
Kaajakari, Ville, et al. "Pulsed ultrasonic release and assembly of micromachines." The 10th International Conference on Solid-State Sensors and Actuators (Transducers '99), Sendai, Japan, Jun. 1999.
Irino, T. et al.,"Optimized Stoneley Wave Device by Proper Choice of Glass Overcoat," IEEE Transactions on Ultrasonics, Ferroelectrics, and Frequency Control, vol. 36, Mar. 1989.
Tomar, M., et al.."Temperature coefficient of elastic constants of SiO 2 over-layer on LiNbO3 for a temperature stable SAW device," Journal of Physics D (Applied Physics), vol. 36,pp. 1773-1777, published 2003.
Yamanouchi, K., et al.."High temperature stable high electromechanical coupling substrates and application for surface acoustic wave devices," 2001 Ultrasonics Symposium, Oct. 6, 2001-Oct. 10, 2001, Atlanta,GA, United States, 2001, pp. 189-192.
Yamanouchi, K., et al.."High temperature stable GHz-range low-loss wide band transducers and filter using SiO2/LiNbO3, LiTaO3," IEEE Transactions on Ultrasonics, Ferroelectrics, and Frequency Control, vol. 42, No. 3, pp. 392-396, May 1995.
Hickernell, F.S., et al.."Use of design of experiments for the optimization of deposited glass on SAW filters," Proceedings of the Annual IEEE International Frequency Control Symposium, vol. 2, pp. 950-953, 1999 (abstract).
Kurosawa, M., et al., "A surface acoustic wave gyro sensor," in Proceedings of International Solid State Sensors and Actuators Conference (Transducers '97), Jun. 16-19, 1997, New York, NY, 1997, pp. 863-866.
Kurosawa, M., et al.,"A surface-acoustic-wave gyro sensor,"in 9th International Solid State Sensors and Actuators Conference (Transducers '97), Jun. 16-19, 1997, Switzerland,1998,pp. 33-39, (abstract).
Lukyanov, D., et al.. "Micro rate gyroscopes based on surface acoustic waves," in 2014 NORCHIP, Oct. 27-28, 2014, Piscataway, NJ, 2014, 4 pages.
Oh, H., et al .,"Development of SAW based gyro scope with high shock and thermalstability" Sensors and Actuators A 165 (2011), pp. 8-15.
Sang Woo Lee, et al., "A micro rate gyroscope based on the SAW gyroscopic effect," Journal of Micromechanics and Microengineering, vol. 17, pp. 2272-2279 , Nov. 2007.
Zhang, Y, et al.,"Enhanced Sensitivity of a Surface Acoustic Wave Gyroscope," Japanese Journal of Applied Physics, vol. 48, pp. 104502-104502-8, Oct. 20, 2009.

(56) References Cited

OTHER PUBLICATIONS

Oh, Haekwan, et al. "Development of a novel surface acoustic wave MEMS-IDT gyroscope," in Reliability, Packaging, Testing, and Characterization of MEMS/MOEMS and Nano devices VIII, Jan. 28, 2009, USA, 2009, pp. 72060I-72061-8.
Hosseinzadegan, H., et al., "Ultra High Sensitivity Graphene Piezoresistive Pressure Sensor," in 2012 Solid State Sensors and Actuators Workshop, Hilton Head Island,S C, 2012.
Rizal, C, et al. "Strain-induced magneto resistance and magnetic anisotropy properties of Co/Cu multilayers," Journal of Applied Physics, vol. 111, (2012) pp. 07C107-1-07C107-3.
Li, H., et al., "Stable polarization self modulation in vertical-cavity surface-emitting lasers," Applied Physics Letters, vol. 72, pp. 2355-2357, May 1998.
Liu, T. et al.,"High-Frequency Self-Modulation in Short-External-Cavity VCSEL With Concave Mirror," Ieee Photonics Technology Letters, vol. 27, No. 3, pp. 280-283, Feb. 1, 2015.
Barbour, N. ,"Inertial MEMS System Applications" NATO, 2010.
Jose, K.A. et al.,"Surface acoustic wave MEMS gyroscope," Wave Motion, vol. 36, pp. 367-381, Oct. 2002.
Prange, M .D. et al.,"Gaussian-beam expansions for focused transducers," in IEEE 1992 Ultrasonics Symposium, Oct. 20-23, 1992, New York, N Y, U S A, 1992, pp. 995-998.
Yalda, I., et al.,"Characterization of ultrasonic focused transducers using axial scans and C-scans" in Review of Progress in Quantitative Nondestructive Evaluation, Jul. 28-Aug. 2, 1996, New York, NY, USA,1997, pp. 927-934.
Fang, S.R. et al., "SAW focusing by circular-arc interdigital transducers on YZ-LiNbO3" IEEE Transactions on Ultrasonics, Ferro electrics and Frequency Control, vol. 36, pp. 178-184, Mar. 1989.
Song-Ru, F., et al.,"Two-dimensional diffraction catastrophe on an anisotropic substrate [surface acoustic waves]" Journal of Applied Physics, vol. 66, pp. 5175-51788, Dec. 1, 1989.
Jia-Hong, S. et al., "High efficiency phononic crystal reflective gratings for surface acoustic waves," in 2011 IEEE International Ultrasonics Symposium (IUS), Oct. 18-21, 2011,Piscataway, NJ, USA, 2011, pp. 996-999.
Yantchev, V. et al., "Phononic SAW transducers with complete frequency band gap characteristics," in2014 IEEE International Frequency Control Symposium, IFCS 2014, May 19, 2014-May 22, 2014, Taipei, Taiwan, 2014, p. IEEEU FFC.
Ropars, G., et al., "Experimental evidence of single round-trip oscillation in polarization self-modulated vertical-cavity surface emitting lasers," Applied Physics Letters, vol. 70, pp. 2661-2663, May 1997.
Budker, D., et al. "Resonant nonlinear magneto-optical effects in atoms," Reviews of Modern Physics, vol. 74, pp. 1153-1201, 2002.
Tin, S., et al., "SAW-based radioisotope-powered wireless RFID/RF transponder," in 2010 IEEE International Ultrasonics Symposium, IUS 2010, Oct. 11, 2010-Oct. 14, 2010, San Diego, CA, 2010, pp. 1498-1501.
Tin, S. et al. "Microfabricated Radioisotope-powered Active RFID Transponder," in International Electron Device Meeting, 2009, pp. 539-542 (abstract).
Tin, S. et al., "Radioisotope Powered Surface Acoustic Wave Transponder," in Power MEMS, Tohoku, Japan, 2008, pp. 49-52.
Hoople, J. et al., "Chip-scale sonic communication using AlN transducers," in Ultrasonics Symposium (IUS), 2013 IEEE International, 2013, pp. 1934-1937.
Hoople, J. et al., "Chip-scale reconfigurable phased-array sonic communication," in Ultrasonics Symposium (IUS), 2014 IEEE International, 2014, pp. 479-482.
Kuo, J. et al., "Towards ultra sonic through-silicon vias (UTSV)," in Ultrasonics Symposium (IUS), 2014 IEEE International, 2014, pp. 483-486.

* cited by examiner

FIG. 1

PRIOR ART

Figure 2: Principle of rate sensing through modulation of speed of sound due to Coriolis force on the metallic dot array.

FIG. 2

PRIOR ART

SURFACE ACOUSTIC WAVE (SAW)-BASED INERTIAL SENSOR, METHODS, AND APPLICATIONS

RELATED APPLICATION DATA

This application is a U.S. National Phase filing of International Application No. PCT/US2017/020374 filed Mar. 2, 2017, which itself claims priority to U.S. Provisional Application No. 62/302,422 filed Mar. 2, 2016, the subject matter of each of which is herein incorporated by reference in their entirety.

GOVERNMENT FUNDING

This invention was made with government support under Grant No. N66001-16-1-4028 awarded by the Space And Naval Warfare Systems Center San Diego—DOD (NAVY-SSCSD). The government has certain rights in the invention.

BACKGROUND

Aspects and embodiments of the invention are generally directed to SAW-based inertial sensors, sensing methods, and sensing applications. More particularly, the embodied invention pertains to SAW-based inertial sensors having improved shock resistance and sensitivity and dynamic range capabilities exceeding that of conventional sensors, and related methods for increasing sensitivity and dynamic range of SAW-based inertial sensors.

Inertial sensors (i.e., one or more accelerometers and/or gyroscopes) can be used to measure the motion of an object to which they are attached. Inertial sensors have been very successful in being operational after a gun shock environment, and then operating for short tactical missions. Gyros and accelerometers can survive 10,000-40,000 g accelerations and 250 rev/s (900,000 deg/s). Once a projectile is launched the initial GPS lock allows for guidance to the target; the IMU can take over even in GPS-denied environments. IMU guided munitions have proven to provide precise munitions in the tactical scenarios where short missions are needed. However, for longer missions greater precision and accuracy are needed in the IMU sensors. There have been several efforts to make MEMS sensors more precise and accurate to approach requirements for navigation grade sensors. At the same time of these efforts it has become apparent that GPS denial will be not only the case in enemy territories, but also in the home territory, creating a GPS-denied world. In such a scenario knowing the initial velocity vectors after projectile firing is critical to minimizing radius-of-error of target delivery. Hence it has become important to devise inertial sensors that not only survive but also operate through the gun launch environments. Operation through high rate environments requires sensors with very high dynamic range, simultaneously with high sensitivity and precision to meet the requirements of tactical to navigation missions.

In addition to projectile missions, there are many defense-related missions that would benefit greatly from inertial sensors. For many robotic applications such as, e.g., driverless cars and robotic soldiers, knowing positions in a GPS-denied world would be very valuable. Such applications include operation in heavily wooded areas and inside buildings. Robots, for example, would potentially run into resistance where high impact (e.g., by collisions with other robots) and rotation rates (e.g., while being thrown in air) would require having inertial sensors that require operation through high shock and rate environments.

In order to sustain operation during gun-launch-scale high accelerations and rotations, it would be beneficial and advantageous to employ solid piezoelectric substrates with surface waves that do not feel any differential inertial shock forces. Currently available SAW inertial sensors tend to have low sensitivity due to the rigidity of the surface. Since SAW waves propagate only on the surface to the depth of a few wavelengths (e.g., 10-100 µm), SAW transducers can be packaged with rigid mechanical boundaries such that operation through shocks and vibrations is possible. SAW resonators can also be made temperature insensitive and can therefore provide defense against likely temperature excursions during gun-launch. SAW transducers can be implemented in lithium-niobate, quartz, and AN on silicon for optimum integration of technologies to achieve highest sensitivity. SAW transducer-based resonators also provide high Q and low phase noise oscillators as frequency references that can be used for lock-in detection of small SAW signals. SAW devices would enable the operation at high frequencies from 100 MHz to 1 GHz. The small wavelengths of 30 µm to 3 µm would enable microscale manipulation of inertial energy.

Figure 1:
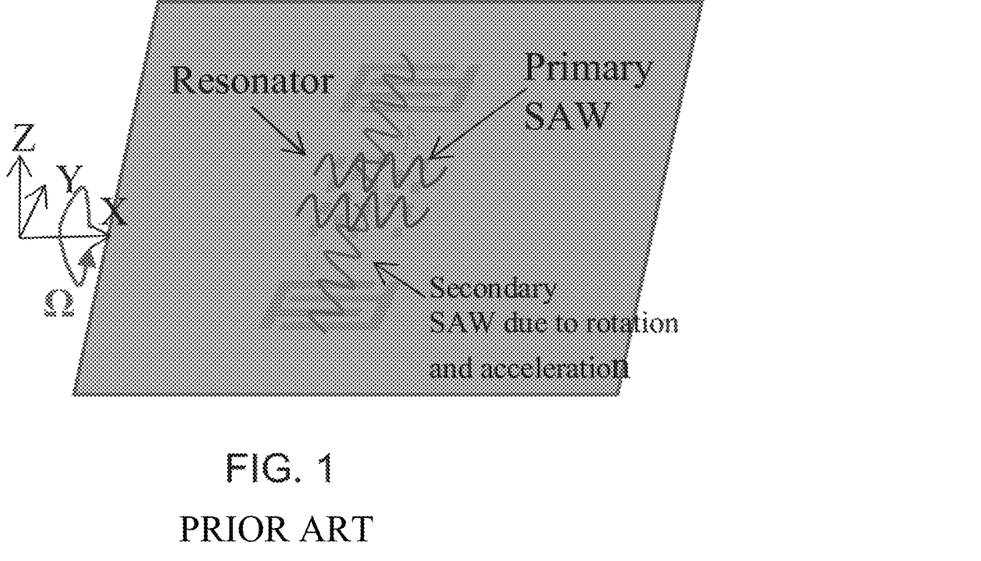
FIG. 1 illustrates the principle of rate sensing through secondary SAW generation due to Coriolis force applied on a metallic mass dot array. Differential SAW receivers will sense rotation, while common mode signals would include acceleration signals, as known in the art.
Figure 2:
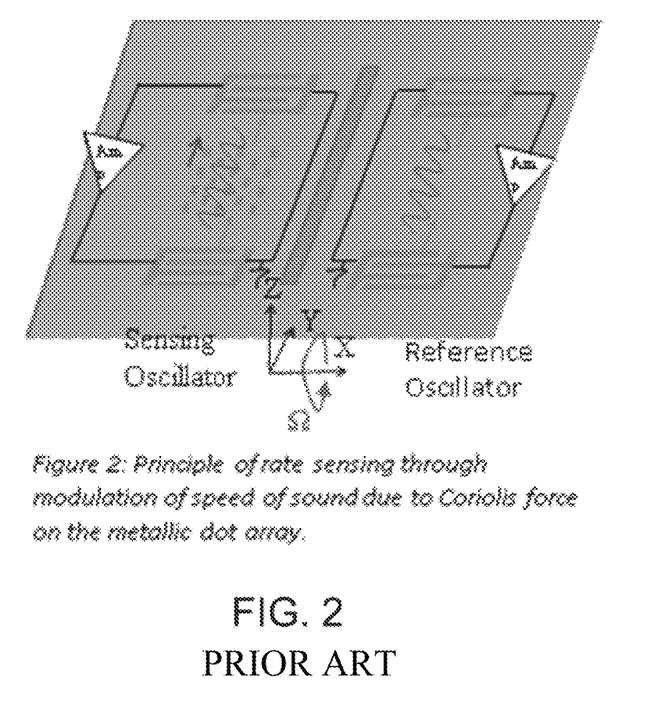
FIG. 2 illustrates the principle of rate sensing through modulation of speed of sound due to Coriolis force on a metallic dot array, as known in the art.

Traditional SAW-based sensors and sensing approaches are illustrated in FIGS. 1 and 2. In the standing wave approach of FIG. 1, a metallic dot array is placed in a checker board like arrangement at the antinodes of the standing wave pattern with a pitch of $\lambda$ in rows and columns. As the Rayleigh wave has an out of plane velocity component, these concentrated lumped masses are subject to a Coriolis force, which cause them to launch a secondary SAW that is perpendicular to the primary SAW. While the simplest approach is to detect the amplitude of the wave directly, the highest rotation rate sensitivities reported in the literature of 172-Hz/(deg/s) are measured by using this secondary wave to modulate the speed of sound of a secondary SAW used as a resonator in an oscillator loop. In the propagating wave approach illustrated in FIG. 2, the presence of a metallic dot array directly leads to a change in the speed of propagation of the Rayleigh Wave. These previous works have demonstrated SAW-based Coriolis force gyroscopes, but they lack in demonstrating high sensitivity. The lack of sensitivity prevents the use of these sensors for inertial measurements as very small rotation rates need to be measured for minimizing the error in position estimated from the inertial sensors.

In view of the aforementioned shortcomings and problems associated with inertial sensors, the inventors have recognized the advantages and benefits to be realized by addressing these shortcomings and problems, advantageously with solutions that can be and are realized by the embodied invention directed to a SAW inertial sensor and associated sensing methods. The embodied invention utilizes some or all of the following techniques and characteristics:

SAW focusing to increase signal;
Conversion from Rayleigh waves to Love waves;
Use of graphene electrodes to sense SAW waves in two configurations—one to measure charge, one to measure resistance change;
50 ohm impedance to match to RF electronic amplifiers;
Optical detection of SAW amplitudes with chip-scale Fabry-Perot having a Rb vapor cavity;
Use of magnetostrictive elements to change local magnetic field due to SAW strain.

These features and characteristics will result in fabrication approaches to add resonant transducing mass-islands to SAW resonators such that they optimize the Coriolis and acceleration forces. The SAW substrates are piezoelectric and may include quartz, lithium niobate, or silicon driven by aluminum nitride films. We generate high Q to maximize drive axis maximum velocity of resonant pillar structures by the primary SAW. SAW horn designs in the form of an etched mesa of the piezoelectric substrate can concentrate the inertial signal carrying waves to small apertures to increase the signal levels.

Graphene electrodes are designed to match impedances to 50 Ohms for conventional electronics pickup. We integrate a FP resonator to measure sonic SAW amplitude and phase. We integrate partially reflecting mirrors, a VCSEL, and photo diodes directly onto the SAW substrate with an alkali metal vapor cell layer, providing the ability to measure the performance of the FP Q, and the ability to measure SAW amplitude resolution. The SAW devices have integrated multi-ferroic elements to rotate and modulate magnetic fields applied to the alkali vapor. We integrate this setup in the optical FP and maximize the sensitivity of output frequency to strain. We optimize the shape and size of multi-ferroic materials, shape, and size to control the dynamic range and sensitivity of the SAW amplitude measurement.

SUMMARY

An aspect of the invention is a SAW-based inertial sensor. In a non-limiting, exemplary embodiment the SAW-based inertial sensor includes a piezoelectric substrate; a SAW drive resonator comprising a first pair of interdigitated transducers (IDTs) and a second pair of IDTs disposed in an orthogonal arrangement on the substrate, adapted to generate a primary SAW wave that propagates between the first pair of IDTs; an array of pillars disposed in a center region of the SAW drive resonator, wherein the pillars are configured to be resonant in a longitudinal resonant mode at a frequency of the primary SAW wave; a SAW-sensing IDT disposed centrally between the second pair of IDTs; a graphene SAW-detection electrode disposed adjacent an inner region of the SAW-sensing IDT; and a multi-ferroic strain-induced magnetic (B) field transducer disposed in a path of a secondary SAW propagating in a transverse direction to the primary SAW. According to various exemplary, non-limiting embodiments, the SAW-based inertial sensor may include the following additional features, limitations, and/or characteristics, alone or in various combinations as a person skilled in the art would understand:

further comprising a mesa region on a top surface of the piezoelectric substrate having two pairs of transversely opposing lobes, wherein the SAW drive resonator, the pillar array, the SAW-sensing IDT, the graphene SAW-detection electrode, and the multi-ferroic strain-induced magnetic (B) field transducer are disposed on the mesa, further wherein the mesa is configured to provide a higher quality factor, Q, to the sensor;

wherein the first pair of IDTs comprises a focusing SAW drive resonator including a pair of opposing curved interdigitated transducers (IDTs) and a corresponding pair of curved Bragg reflectors disposed adjacent an outer portion of each respective curved IDT, disposed on the one pair of opposing lobes of the mesa;

wherein the mesa is in the shape of a horn incorporating an anisotropy of the SAW speed to concentrate the SAW to the pillars;

wherein the resonant pillars are located at the maxima and minima of a standing primary SAW such that a velocity of the pillars is maximized by the SAW;

wherein the graphene SAW-detection electrode is characterized by a variable resistance as a function of the SAW;

wherein the graphene SAW-detection electrode has a resistance of 50 Ohm.

An aspect of the invention is a detection method. In a non-limiting, exemplary embodiment the detection method includes the steps of providing a SAW-based inertial sensor; generating a primary SAW to maximize a velocity of the pillar array into a longitudinal mode resonance at the frequency of the primary SAW; generating a secondary SAW in a direction transverse to the direction of the primary SAW; generating strain from the secondary SAW and using said strain to modulate a magnetic field in the multi-ferroic strain-induced magnetic (B) field transducer; comparing a B-modulated hyperfine frequency transition of the alkali vapor in the multi-ferroic strain-induced magnetic (B) field transducer with a non-B-modulated hyperfine frequency transition of the alkali vapor to produce a frequency output related to an inertial rotation measurement of the sensor.

It should be appreciated that all combinations of the foregoing steps, features, limitations, and/or characteristics, and additional aspects and embodiments discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

DETAILED DESCRIPTION OF NON-LIMITING, EXEMPLARY EMBODIMENTS

Figure 9:
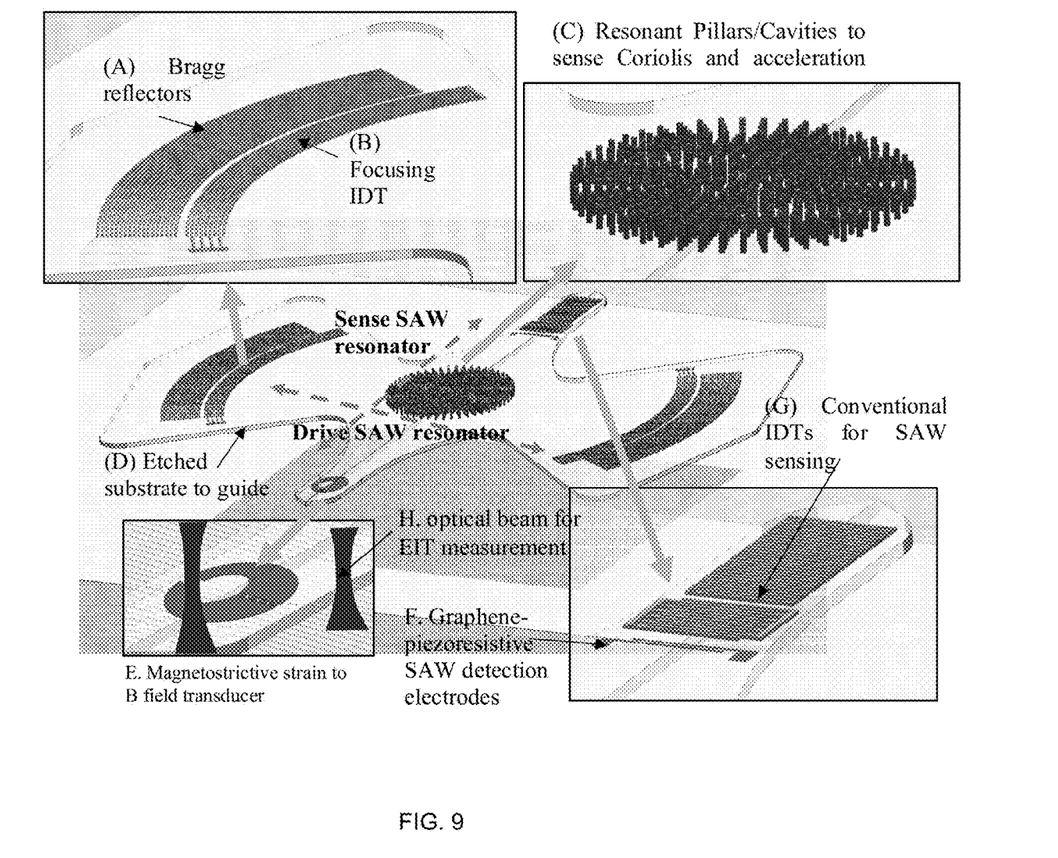
FIG. 9 is an exploded schematic view of a SAW-based inertial sensor according to an illustrative embodiment of the invention.

A non-limiting, exemplary embodiment of the invention is a SAW-based inertial sensor 1000 as illustrated in FIG. 9 (not showing the piezoelectric substrate). The embodied architecture enables an increase in the sensitivity by 3-4 orders of magnitude by the following illustrated aspects: SAW lensing using focusing IDTs (A) and funneling structure (etched mesa; D) to increase sensed signal; Graphene-piezoresistive SAW detection electrodes (F) which provide 10-100 times higher sensitivity then the built in piezoelectricity of the SAW substrate; a resonant pillar/cavity array (C) to achieve Q amplification of the Coriolis forces, improving sensitivity by factors of 10-500 depending on the quality factor; EIT-based optical detection of SAW amplitude to optically measure the displacement with wavelength stabilized by alkali atom transitions (H); use of alkali metal vapor based hyperfine transition energies modulated by multi-ferroic strain-induced B-field modulation of the alkali atoms (E), such that (via (H) and (E), frequency output rather than amplitude will be measured enabling 10 orders of dynamic range.

Figure 3A:
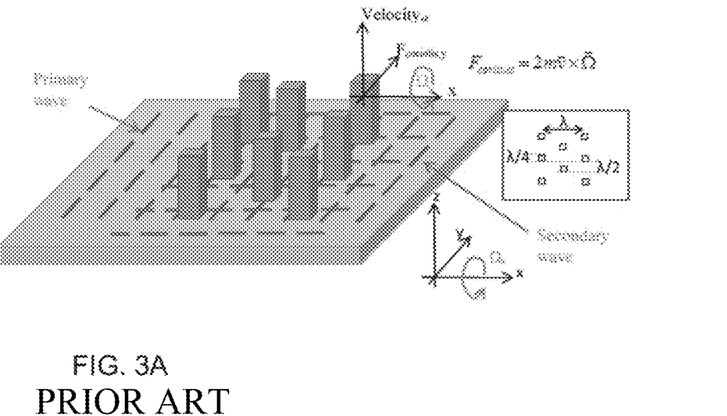
FIGS. 3A and 3B illustrate the generation of Coriolis force through amass island structure array, placed in checkboard pattern, due to a primary SAW Wave. Coriolis force will be along the y-axis due to the out-of-plane velocity component of the primary SAW. This induces a secondary wave, whose amplitude is proportional to the velocity and propagates perpendicular to the primary wave, as known in the art.
Figure 3B:
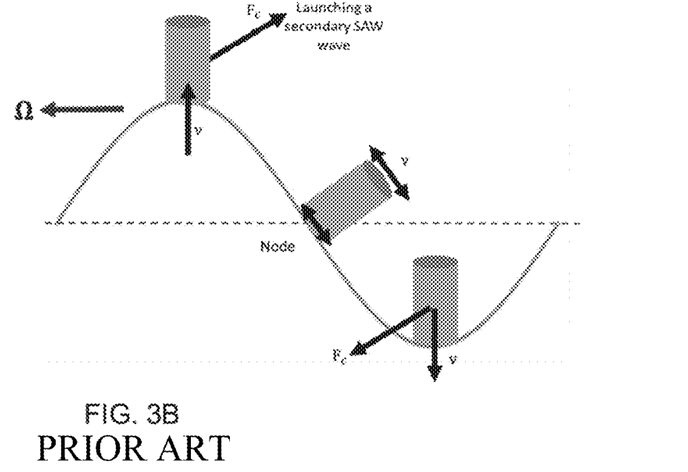

FIGS. 3A and 3B illustrate the generation of Coriolis force through a mass island array, placed in checkboard pattern, due to a primary SAW Wave. Coriolis force will be along the y-axis due to the out-of-plane velocity component of the primary SAW. This induces a secondary wave, whose amplitude is proportional to the velocity and propagates perpendicular to the primary wave. According to the embodied invention, the Coriolis force, $F=2mv\times\Omega$, in response to the rotation rate $\Omega$ can be maximized by increasing the velocity v of the moving parts, which is the resonant pillar array in the embodied invention. The velocity of the pillars induces secondary SAW waves due to the Coriolis force on the pillars transferred to the substrate, with the Coriolis force originating from rotation of the substrate orthogonal to the velocity of the pillars. As the amplitude of the secondary SAW increases so does the sensor sensitivity. This can be done by concentrating the energy generated by the focusing IDTs (Interdigitated Digitated Transducers).

Bragg Reflectors of Co-Resonant SAW Cavities

Figure 11:
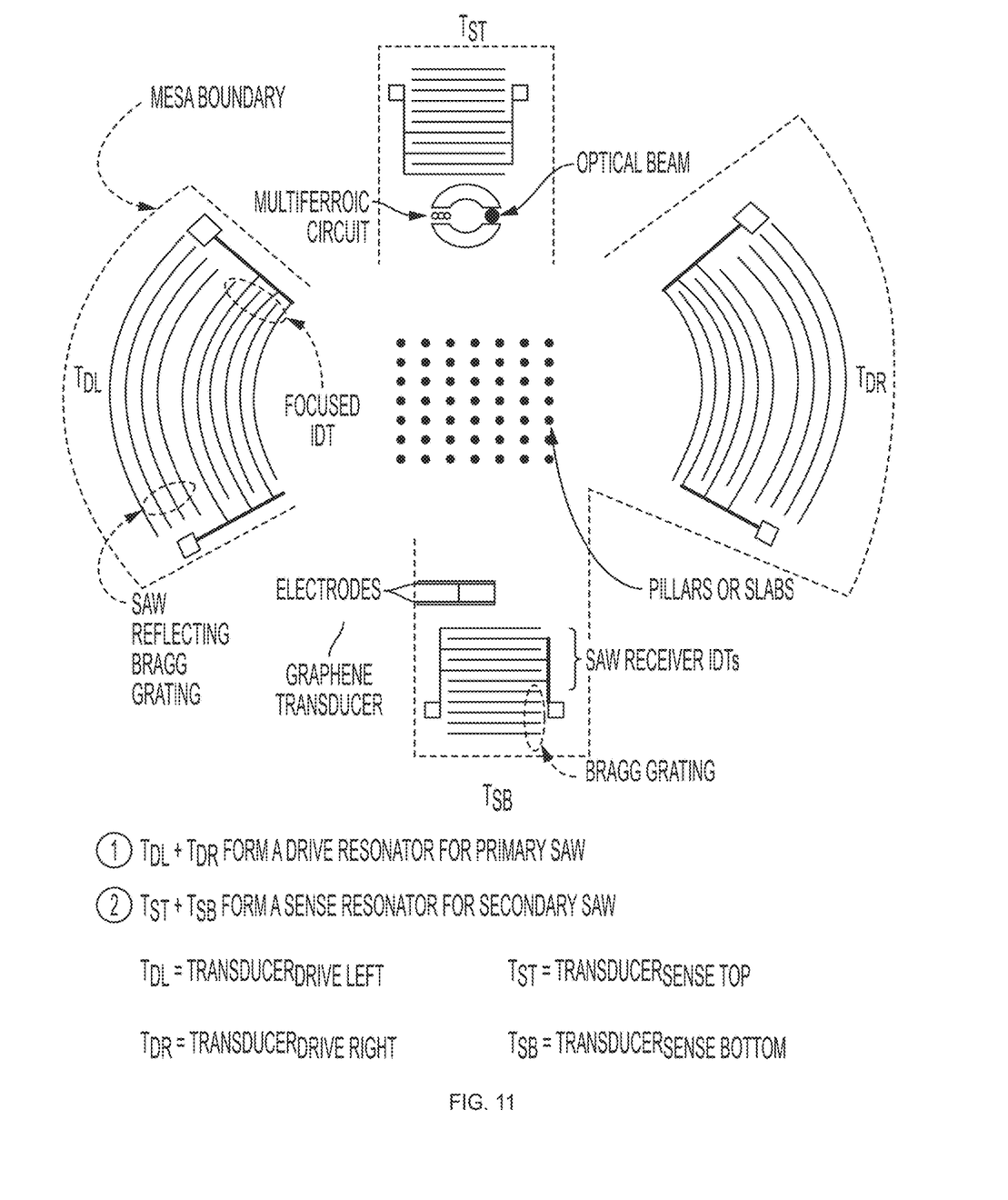
FIG. 11 is a schematic top plan view of a SAW-based inertial sensor architecture illustrating a plurality of features/components listed in Table 1, according to a demonstrative illustration of the embodied invention.
Figure 12:
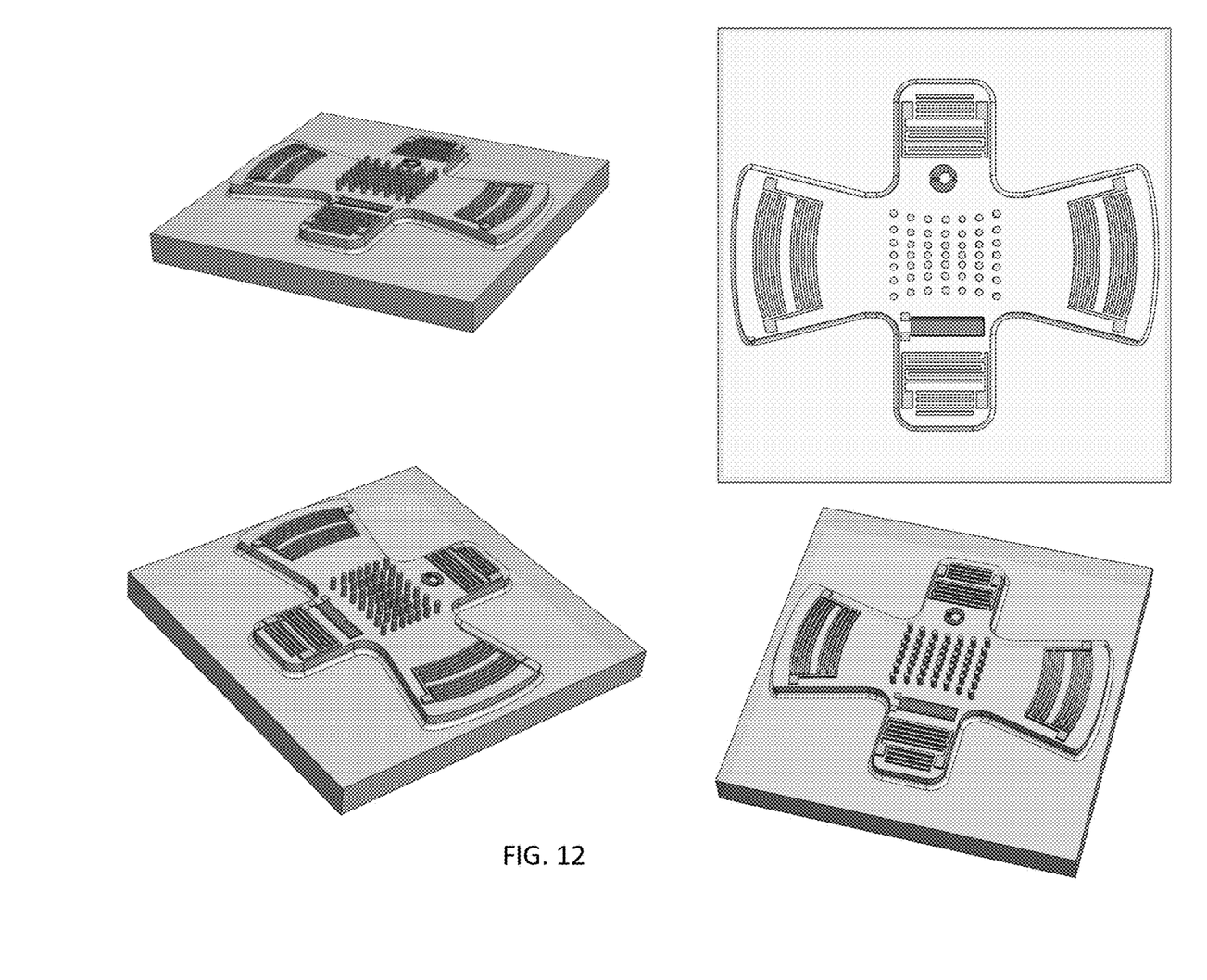
FIG. 12 shows different schematic views of a SAW-based inertial sensor on a piezo-substrate with focusing electrodes/IDTs for the primary SAW, sensing resonator for secondary SAW, pillar array, mesa (horn), graphene transducer, and magnetic circuit, according to demonstrative illustrations of the embodied invention.
Figure 13:
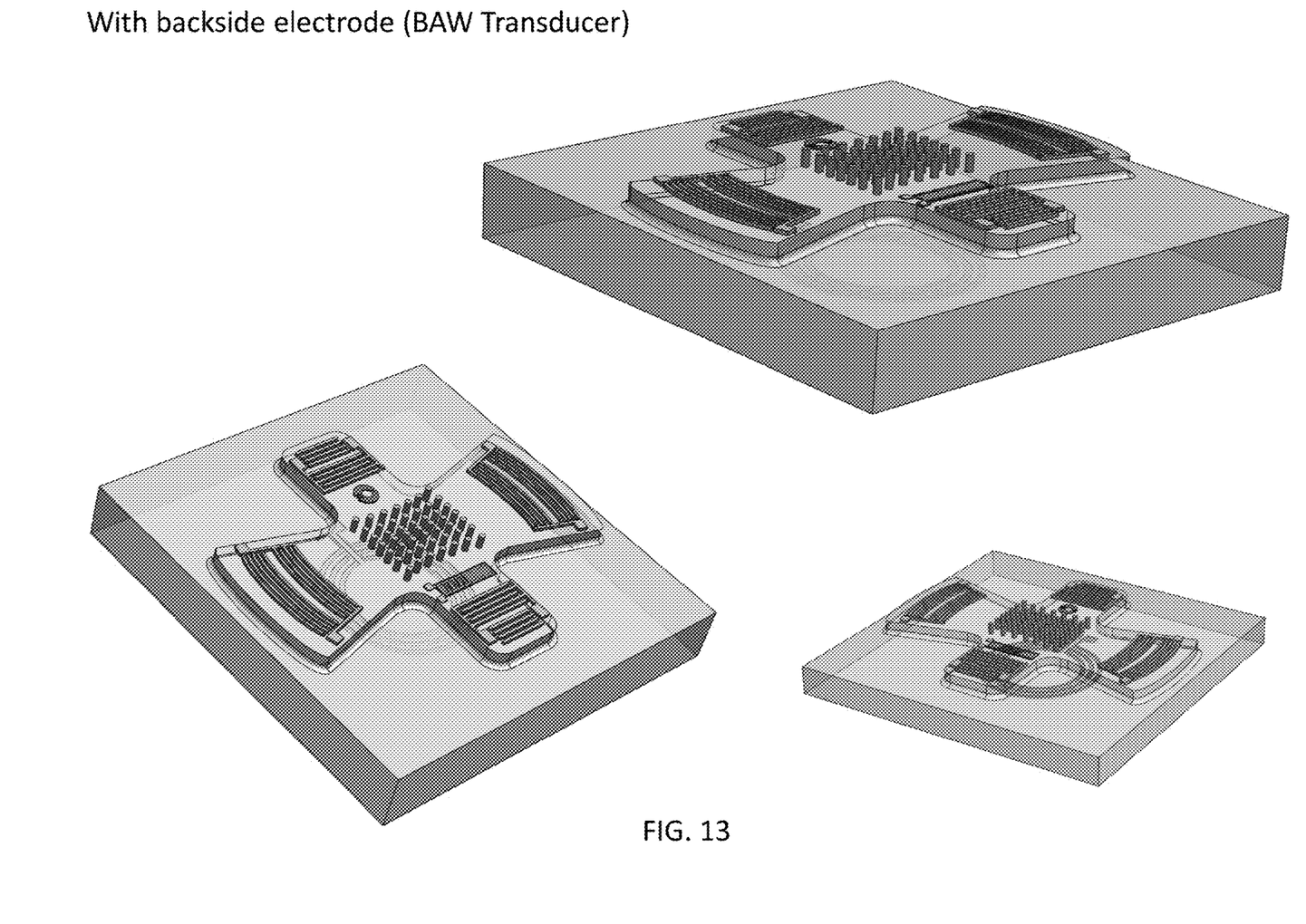
FIG. 13 shows different schematic views of a SAW-based inertial sensor similar to those in FIG. 12 with the addition of a backside electrode, according to demonstrative illustrations of the embodied invention.

Reflecting IDTs can reflect the SAWs going away from the IDT transducers to the left back to the right as shown in FIG. 11. The energy reflected back traverses the entire channel and is then reflected back from the right side to form a resonator. A Bragg reflector based resonant cavity is used to amplify the standing waves in the sense direction as well. Typical Qs of these resonators can be 1000-10,000 in the frequency range of 100-300 MHz. The Q factor of the drive resonator can be used to maximize the velocity v of the pillars, while the Q factor of the sense resonator can be used to maximize the strain that can be detected. The drive and sense signal bandwidth will be constrained by $f_{SAW}/Q$, which is still 100 KHz for a SAW frequency of 200 MHz and a Q of 2000.

Focused IDT Transducers

Figure 4:
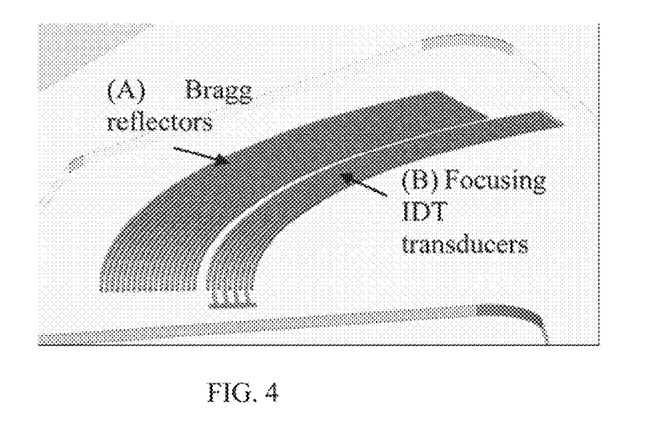
FIG. 4 illustrates focusing IDTs and curved Bragg reflectors as components of a SAW drive resonator, according to an illustrative aspect of the invention.

Curved SAW electrodes as illustrated in FIG. 4 generate waves that are focused at the radius of curvature to amplify the particle (pillar) velocity. The maximum pillar velocities achievable in Lithium Niobate is ~30-40 m/s, determined by the maximum mechanical strain possible in high quality crystals. Typical gains in the focused transducers can be 5-50, with higher gains leading to higher wave dispersion owing to directional wave velocities in piezoelectric crystals. On the acoustic side, we will fabricate SAW based acoustic impedance transformers to realize higher density of acoustic energy via curved IDT electrode structures than what can be realized using conventional linear electrode array. We use the curved transducers and curved Bragg reflectors to increase the surface velocity in the middle of the resonator to drive the pillars at the highest possible velocities. The Bragg reflectors are placed at a distance optimized to maximally reflect the SAW launched towards it, and the finger spacing and finger width as a function of angle from the center axis of the Bragg reflector are chosen to accommodate the wave speed anisotropy to maximally focus the SAWs to the pillars.

Pillar Resonances

Existing SAW gyros rely on additions of different density, non-resonant, thin film patches placed in a λ-spaced checkboard fashion as shown in FIG. 3A. By making the pillars resonant with the input frequency, we maximize the velocity of the pillars' signal from the forces by the Q of the resonator. There is considerable literature in the area of using SAQW phononic bandgaps for improving filters, and we plan to use this knowledge to optimize our devices. According to the embodied invention, pillars made of silicon or metals can be placed at the locations to be base driven into resonance. The pillar longitudinal mode resonances with nodes at the anchor will have resonances when the height of the pillar $$h_{pillar} \sim \frac{\lambda_L}{4},$$

where $\lambda_L$ is the longitudinal wavelength corresponding to $$\frac{c_L}{f_{SAW}}$$

the longitudinal speed of sound $C_L$. The width of the pillar is advantageously less than $$w_{pillar} < \frac{\lambda_{SAW}}{4},$$

where $\lambda_{SAW}$ is the SAW wavelength corresponding to $$\frac{c_{SAW}}{f_{SAW}}.$$

Hence the aspect ratio of the pillars is greater than $$\frac{h_{pillar}}{w_{pillar}} > \frac{c_L}{c_{SAW}} \sim 3$$

for most materials. For low aspect ratios, the longitudinal mode is likely to dominate. At higher aspect ratios of the pillars, the bending and torsional modes of the pillars can be excited. In any case, if the pillars are excited at resonance, the velocity can be magnified by the Q of the resonators, which is likely to be in the few 100s to 1000s for metal pillars such as copper, while much higher in the $10^4$ to $10^6$ range for pillars made of silicon.

P-Wave Excitation of Pillars

Figure 5A:
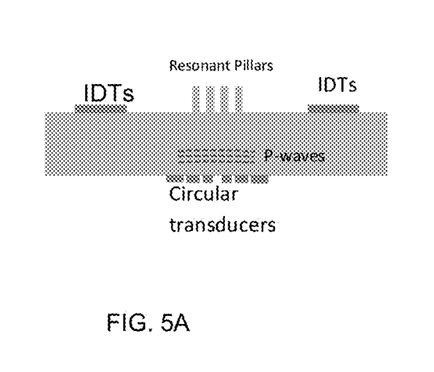
FIGS. 5A and 5B illustrate transducer arrangements for driving the resonant pillar array. In addition to resonantly driving the transducing pillars/slabs at the primary SAW frequency by the primary SAW waves, the elements can also be driven from the base by excitation from P-wave or pressure waves launched from the backside of the substrate by circular IDTs that can generate focused intensity to the pillars, according to illustrative aspects of the invention.
Figure 5B:
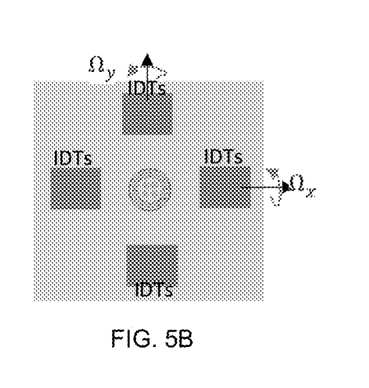

Referring to FIG. 5A and FIG. 5B, in addition to driving the transducing pillars/slabs by SAW waves, we can also drive the elements from the base by excitation from P-wave or pressure waves launched from the backside of the substrate. This can be achieved by circular IDTs defined on the back side that can generate focused intensity to the pillars. This configuration has the added benefit of then launching SAW waves in response to rotation around the two orthogonal axes of the chip.

Graphene Electrodes

Figure 6:
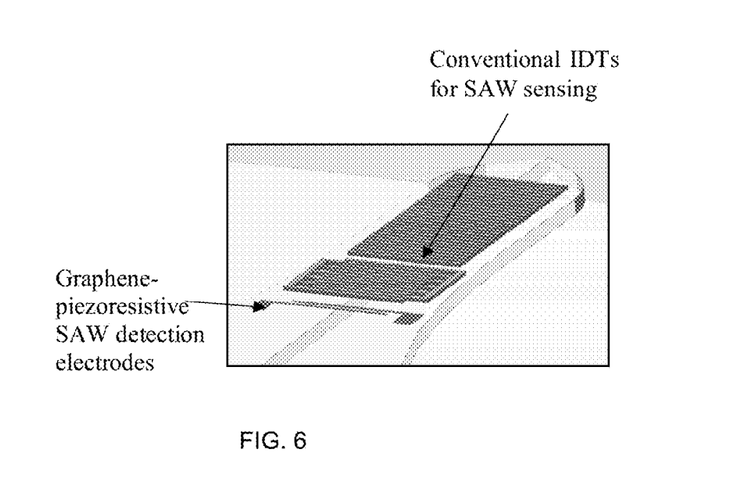
FIG. 6 illustrates conventional IDTs for SAW sensing and Graphene-piezoresistive SAW detection electrodes on a lobe of an etched mesa (horn) of the substrate in the path of a secondary SAW, according to an illustrative aspect of the invention.

Referring to FIG. 6, one method to improve the sensitivity is to use higher frequency SAW devices. However, as described above, maximum SAW frequency is limited by significant roadblocks, such as losses, lithographic resolutions, and gain-bandwidth product of electronics. IDT electrodes are by far the most common method of SAW transduction. While often realized by aluminum, as long as mass loading and hence thickness is kept low along with series resistance, different metals can also be used. Graphene as electrode material is novel, due to graphene's unique properties such as carrier mobility, surface sensitivity and wide spread use in novel solid-state device research. Our group has recently showed high gauge factors, as large as 18000, in graphene for piezoresistive detection of strain. A key advantage of using graphene for measurements of the SAW field is that the graphene is very thin and hence produces very small perturbations on the SAW standing wave patterns. RF signals need to be coupled to external signals through the use of 50-ohm compatible electronics, and connectors. In SAW devices smaller electrodes are often designed to implement the right input impedance of 50 ohms after careful design, and still require considerable design and optimization adding components and matching adjustments. Graphene electrodes offer a direct path to providing a 50 ohm output impedance without the need for any impedance matching to RF circuits independent of the cross-section of the SAW waves. As the SAW waves are focused down to smaller areas, the graphene pickups can be scaled to still provide an effective 50 ohm resistance change by choosing the appropriate width and lengths of the graphene resistors.

Figure 7:
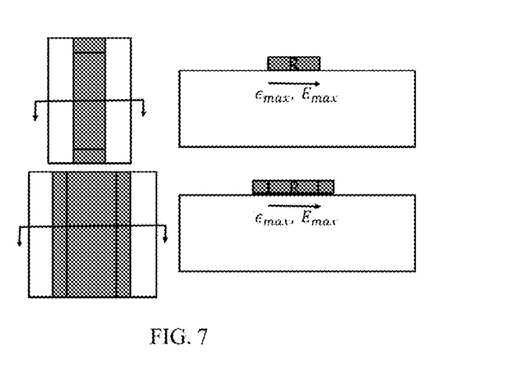
FIG. 7 illustrates Graphene coated IDTs, according to illustrative aspects of the invention.

Referring to FIG. 7, the graphene electrodes are placed such that the metal electrodes connected to the graphene are placed across the graphene along the SAW propagation direction, or orthogonal to the SAW propagation direction. In the first case, the electrons in the graphene are travelling in the same directions as the SAW while in the latter case, the electrons are drifting in the orthogonal direction. The effect of the strain on resistivity can have a different effect on the graphene resistors placed at strain nodes and antinodes. By taking ratios of resistances of graphene resistances we can form resistors that can be used to cascade into Wheatstone bridges. In SAW transducers it is also known that the IDT fingers hold charges that are highly concentrated on the edges of the IDT fingers. The electric field between the two IDTs with opposite charges result in higher charge concentration on the edges. We use this fact to place graphene on the edges of the IDTs across an oxide barrier to use the field effect to change the conductivity of the graphene resistance. In this case, graphene acts as layer of semiconductor in which the charge on the IDT induces a change of conductivity through the insulating $SiO_2$ layer on the aluminum IDT.

Graphene Rectifier

Figure 10:
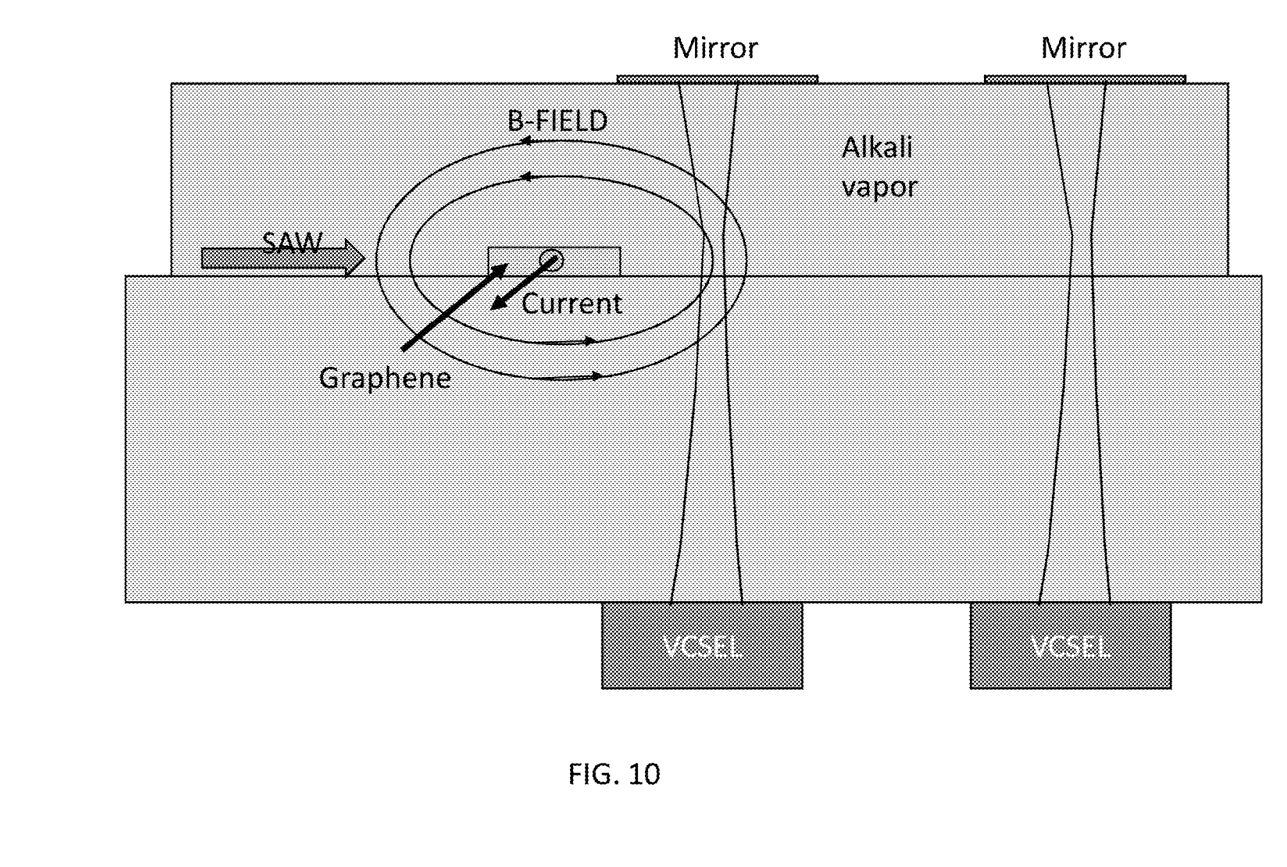
FIG. 10 schematically shows a cross sectional view of a Graphene rectifier-induced DC current for B-field for Alkali metal atomic transition, according to an illustrative aspect of the invention.

Referring to FIG. 10, the SAW wave incident into the graphene resistor can covert the AC SAW strain field into a DC current flowing through the graphene. The B-field generated would then modify the hyperfine transitions of the alkali atom vapor around the graphene resistor.

Optical Measurement

Figure 8:
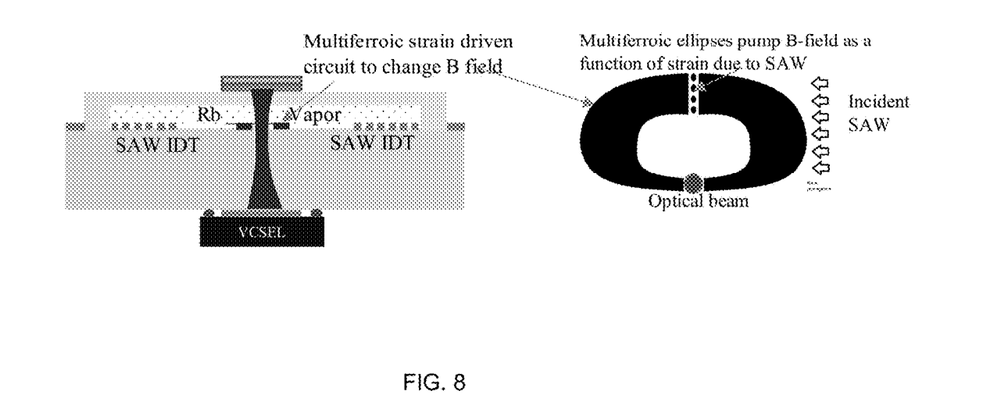
FIG. 8 illustrates a multi-ferroic magnetic circuit (on the right) that is placed at the laser focal point of a FP resonator on another lobe of the etched mesa of the substrate in the path of the secondary SAW to measure strain. The induced strain on the ellipsoidal multi-ferroic islands rotate the B-field in the optical focus area, changing the hyperfine transition frequency in the Rb alkaline vapor, according to an illustrative aspect of the invention.

Referring to FIG. 8, we use the shift in the hyperfine frequency of an alkali vapor as a function of applied magnetic field to produce a frequency output based inertial sensor. Our inertial sensors, both gyroscopes and accelerometers, produce strain in the SAW substrate. We use a new approach to measure the hyperfine frequency of alkali atom vapor as a function of magnetic field that is applied by thin film multi-ferroic nano-elements integrated on top of the SAW substrates. Multi-ferroic modulation of the B-field can be very sensitive to strain and can be designed choosing the shape factor of multi-ferroic elements. As the strain resulting from Coriolis force or acceleration is applied to multi-fierroic films, the B-field from the elements will rotate to align with the strain direction on a time scale of nanoseconds. We use this strain-dependent anisotropy to modulate the magnetic field seen by the alkali atom vapor in the optical path. Optical locking onto the hyperfine frequency, and then mixing within a second cavity with un-shifted hyperfine frequency will produce a frequency output up to 9 GHz, representing ~10 orders of magnitude.

More particularly (refer to FIG. 10 for illustration of two laser architecture), the optical beam used to interrogate the alkali atoms is reflected off a mirror surface off the glass lid used to trap the alkali vapor to form a Fabry-Perot optical cavity. Two optical beams are used to lock to the alkali atoms, one interrogating the alkali atoms above the magnetic circuit-effected vapor, and another away from the magnetic field-effected vapor. The two optical beams are sampled on a photodiode to mix the two signals to generate a frequency corresponding to the difference in the two hyperfine locked beams. The magnetic field used to modulate the hyperfine transition frequency is generated by the current flowing in a graphene wire that converts the SAW time-varying amplitude into an average DC current.

Although particular various aspects and embodiments have been described herein above, it is expected to be appreciated by a person skilled in the art that certain singular features or components as specified in an embodied SAW-based inertial sensor form the basis for a novel and inventive SAW-based inertial sensor. These features or components include: resonant pillars; Graphene transduction at RF frequency—modulation of graphene conductivity; curved or focusing drive electrodes; multi-ferroic detection (with laser); and, Graphene rectifier-induced DC current for B-field for Alkali metal atomic transition. A conventional SAW-based inertial sensor incorporating any single one of these features/components or any combination of more than one of these features/components is considered to form the basis for a novel and inventive SAW-based inertial sensor. Table 1 below sets forth each of these features/components and their mechanism of increased sensor sensitivity.

TABLE 1

| Mechanism of increased sensitivity | Resonant piffers | Graphene transduction @ RF frequency-modulation of graphene conductivity | Curved drive electrodes | Multiferroic detection (with laser) | Drive resonator-non curved IDTs | Graphene rectifier induced DC current for B-field for Alkali metal atomic transition |
|---|---|---|---|---|---|---|
| 1 Prior art | No | No | No | No | Yes | No |
| 2 Increase Sensitivity by Q of pillar | Yes | No | No | No | Yes | No |
| 3 Increase by grain of curved IDTs | No | No | Yes | No | No | No |
| 4 Q gain of pillars and curved electrode gain | Yes | No | Yes | No | No | No |
| 5 Graphene sensitivity higher and impedance is 50-ohms | No | Yes | No | No | Yes | No |
| 6 Multiferroic detection | No | Yes | No | Yes | Yes | No |
| 7 Graphene rectifier detection | No | Yes | No | No | Yes | Yes |

In the gist of Table 1, FIG. 11 is a schematic top plan view of a SAW-based inertial sensor architecture illustrating a plurality of features/components listed in Table 1, according to a demonstrative illustration of the embodied invention.

FIG. 11 is a schematic top plan view of a SAW-based inertial sensor architecture illustrating a plurality of features/components listed in Table 1, according to a demonstrative illustration of the embodied invention.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

We claim:

1. A SAW-based inertial sensor, comprising:
   a piezoelectric substrate;
   a SAW drive resonator comprising a first pair of interdigitated transducers (IDTs) and a second pair of IDTs disposed on the substrate, adapted to generate a primary SAW wave that propagates between the first pair of IDTs;
   an array of pillars disposed in a center region of the SAW drive resonator, wherein the pillars are configured to be resonant in a longitudinal resonant mode at a frequency of the primary SAW wave;
   a SAW-sensing IDT;
   a graphene SAW-detection electrode disposed adjacent an inner region of the SAW-sensing IDT; and
   a multi-ferroic strain-induced magnetic (B) field transducer disposed in a path of a secondary SAW propagating in a transverse direction to the primary SAW wave.

2. The SAW-based inertial sensor of claim 1, further comprising:
   a mesa region on a top surface of the piezoelectric substrate having two pairs of transversely opposing lobes, wherein the SAW drive resonator, the pillar array, the SAW-sensing IDT, the graphene SAW-detection electrode, and the multi-ferroic strain-induced magnetic (B) field transducer are disposed on the mesa, further wherein the mesa is configured to provide a higher quality factor, Q, to the sensor.

3. The SAW-based inertial sensor of claim 2, wherein the first pair of IDTs comprises a focusing SAW drive resonator including a pair of opposing curved interdigitated transducers (IDTs) and a corresponding pair of curved Bragg reflectors disposed adjacent an outer portion of each respective curved IDT, disposed on the one pair of opposing lobes of the mesa.

4. The SAW-based inertial sensor of claim 1, wherein the resonant pillars are located at the maxima and minima of a standing primary SAW such that a velocity of the pillars is maximized by the SAW.

5. The SAW-based inertial sensor of claim 2, wherein the mesa is in the shape of a horn incorporating an anisotropy of the SAW speed to concentrate the SAW to the pillars.

6. The SAW-based inertial sensor of claim 1, wherein the graphene SAW-detection electrode is characterized by a variable resistance as a function of the SAW.

7. The SAW-based inertial sensor of claim 1, wherein the graphene SAW-detection electrode has a resistance of 50 Ohm.

8. A sensing method, comprising:
   providing a SAW-based inertial sensor of claim 1;
   generating a primary SAW to maximize a velocity of the pillar array into a longitudinal mode resonance at the frequency of the primary SAW;
   generating a secondary SAW in a direction transverse to the direction of the primary SAW;
   generating strain from the secondary SAW and using said strain to modulate a magnetic field in the multi-ferroic strain-induced magnetic (B) field transducer;
   comparing a B-modulated hyperfine frequency transition of the alkali vapor in the multi-ferroic strain-induced magnetic (B) field transducer with a non-B-modulated hyperfine frequency transition of the alkali vapor to produce a frequency output related to an inertial rotation measurement of the sensor.

* * * * *